Nov. 20, 1934.  W. H. YOST  1,981,714
DUMP CAR
Filed Nov. 30, 1931   5 Sheets-Sheet 1

INVENTOR.
Winfield Hancock Yost

Nov. 20, 1934.    W. H. YOST    1,981,714
DUMP CAR
Filed Nov. 30, 1931    5 Sheets-Sheet 4

Inventor
Winfield Laucock Yost

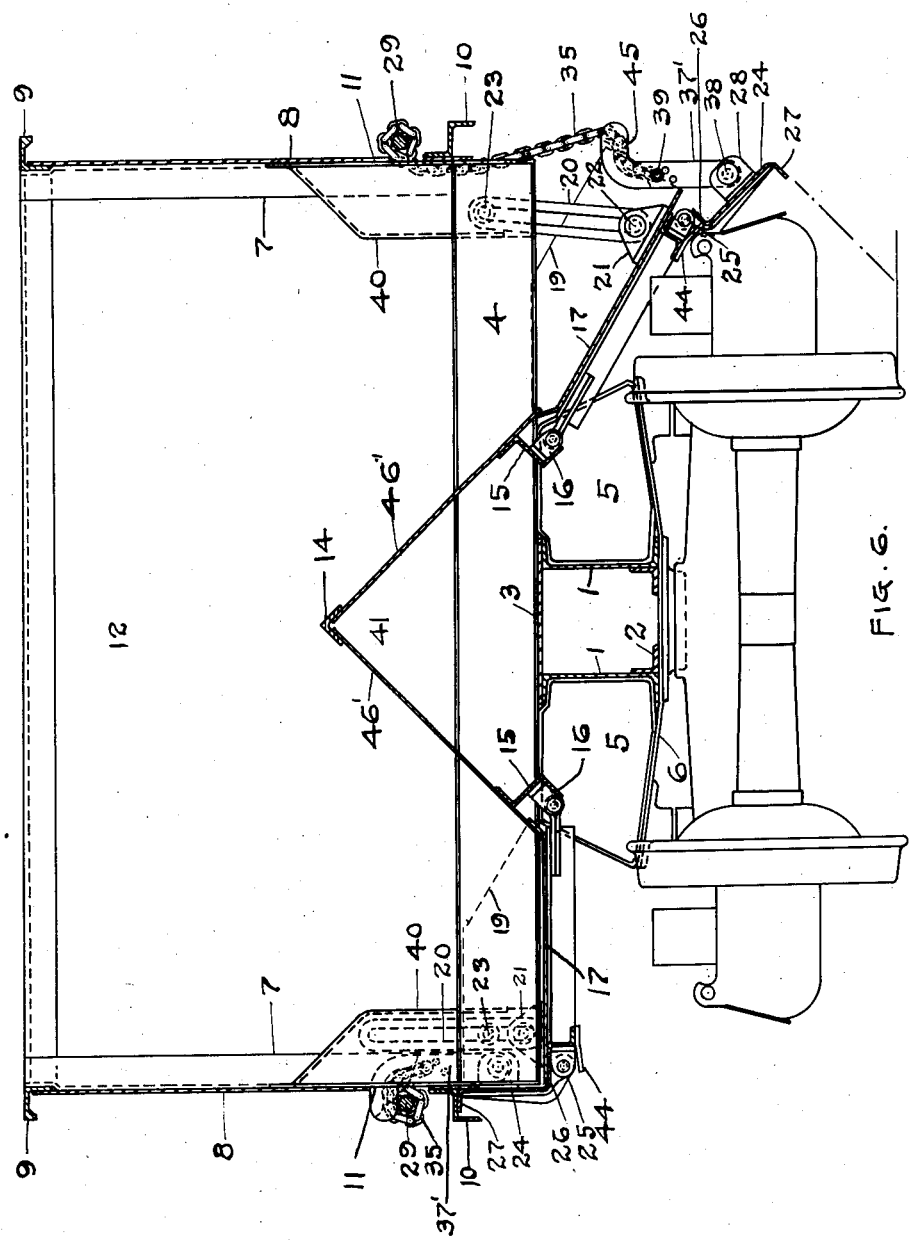

Patented Nov. 20, 1934

1,981,714

UNITED STATES PATENT OFFICE 1,981,714

DUMP CAR

Winfield Hancock Yost, Montreal, Quebec, Canada

Application November 30, 1931, Serial No. 577,987

15 Claims. (Cl. 105—244)

This invention relates to improvements in dump cars, and more particularly to the dump cars of the well known general service type, in which the load is discharged to each side and the full length of the car body. It may also be used to advantage for cars dumping to each side but between the trucks only.

An object of the invention is to provide a load discharging car suitable for discharging its load to each side and clear of the rails.

A further object of the invention is to provide in a car of its character, a door or doors so arranged that the joint at the edges of the door or doors will be tight, and that when the door is in open position the door will prevent the discharged material from flowing back upon the rail, which would thereby cause a loss of material, a liability of derailment should the car be moved before the rail is cleaned off, a loss of time and expense in rehandling such material.

Another object of the invention is to provide a suitable operating mechanism which will be easily and quickly operated.

In the former dump car known as the general service type, serious objections have been found in that the floor of the car is high, with a high center of gravity, that it is impossible to make and keep the door tight to prevent the loss of valuable material in transit, and when dumped the contents of the car will flood the car underframe parts, trucks and track, thereby making it necessary to clean such materials off the underframe, etc. and dig the car out before it is moved. This causes a large expense of money and time, which will be avoided in my improved car. I provide instead of the usual individual doors between the transverse members at the floor level, a two level floor comprising a fixed section at the usual floor level and an inclined portion to a door at a lower level. Said door being below the transverse members from end sill to end sill either in one or two sections. The floor over the longitudinal central portion of the car may be flat or inclined according to individual requirements.

In the following I will describe the invention in detail of which:—

Figure 6 is a cross section showing alternate cross section of car.

Figure 1:
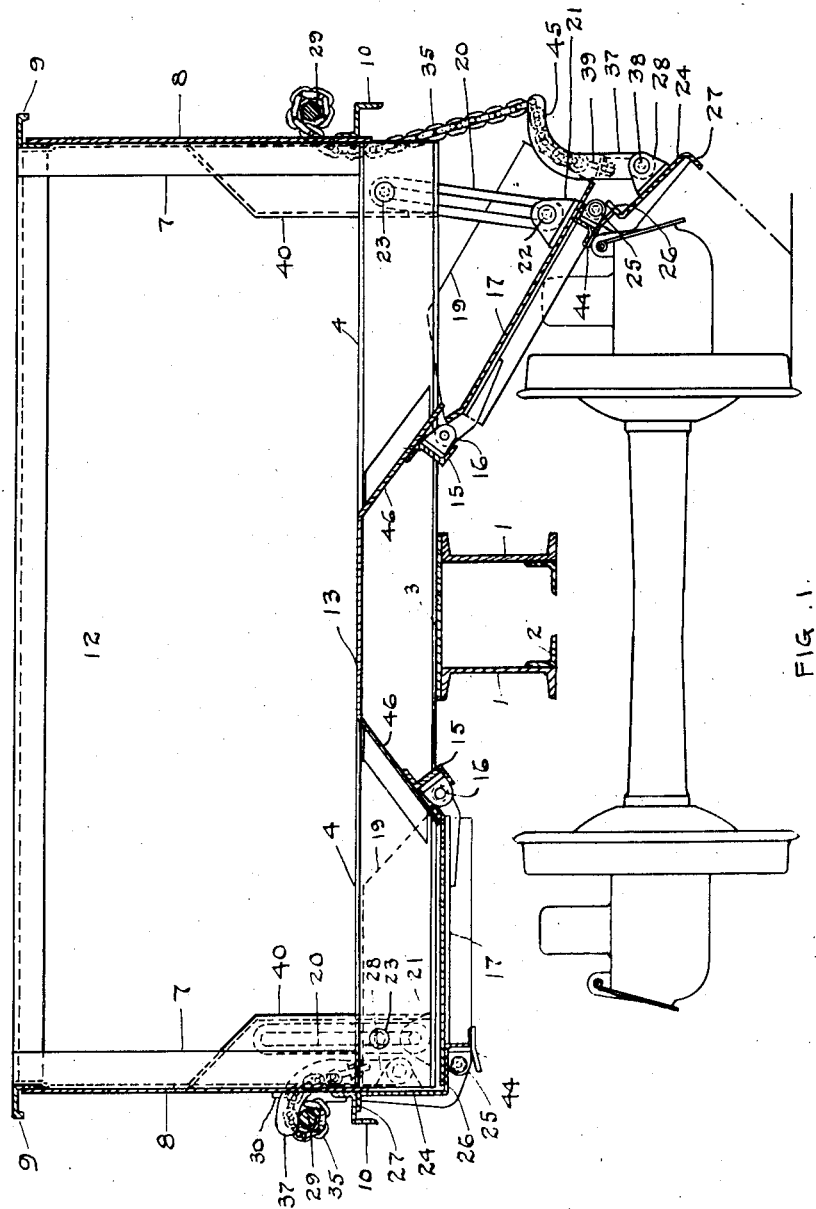
Figure 1 is a cross section of the car taken on line AA Fig. 2 in which the right hand side shows the door open for discharging the contents of the car and the left hand side showing the door closed and in locked position.
Figure 2:
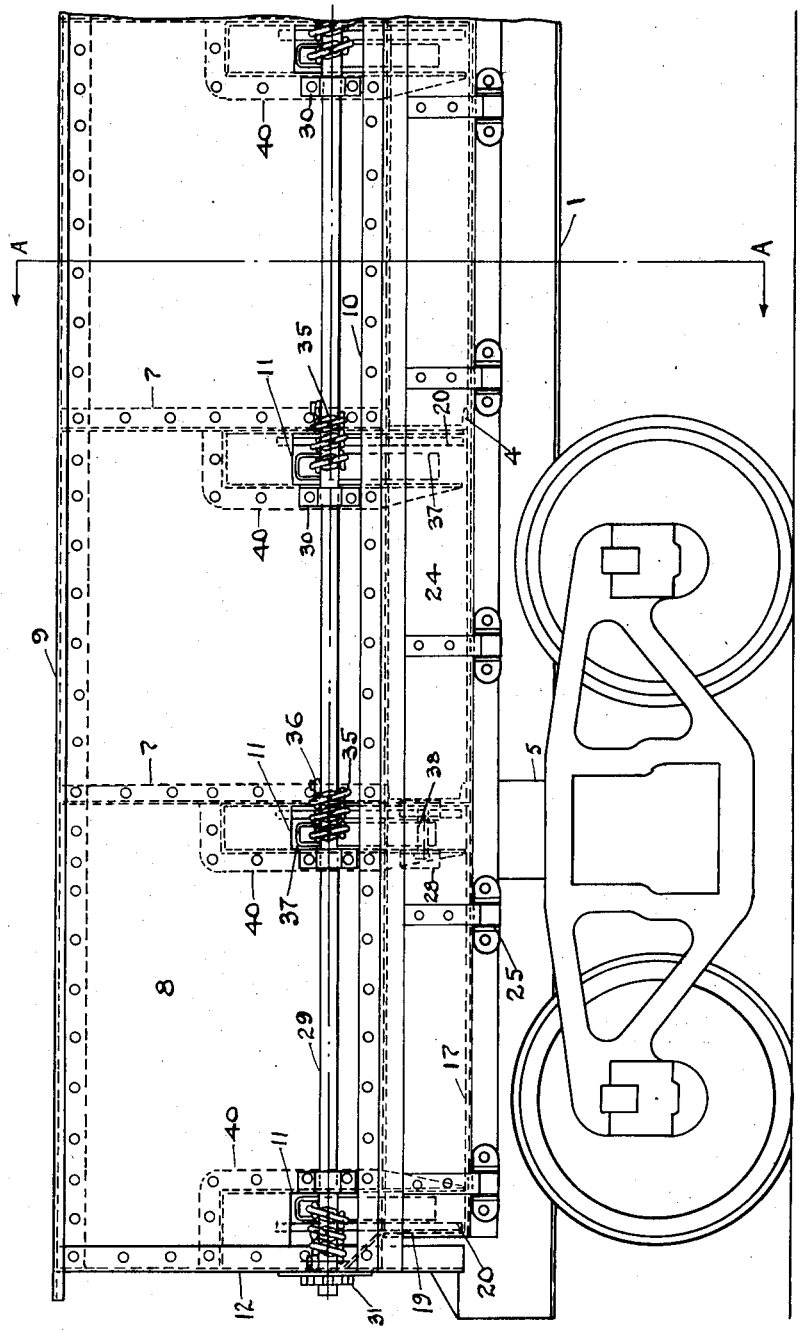
Figure 2 is a side elevation of part of the car with doors closed.
Figure 3:
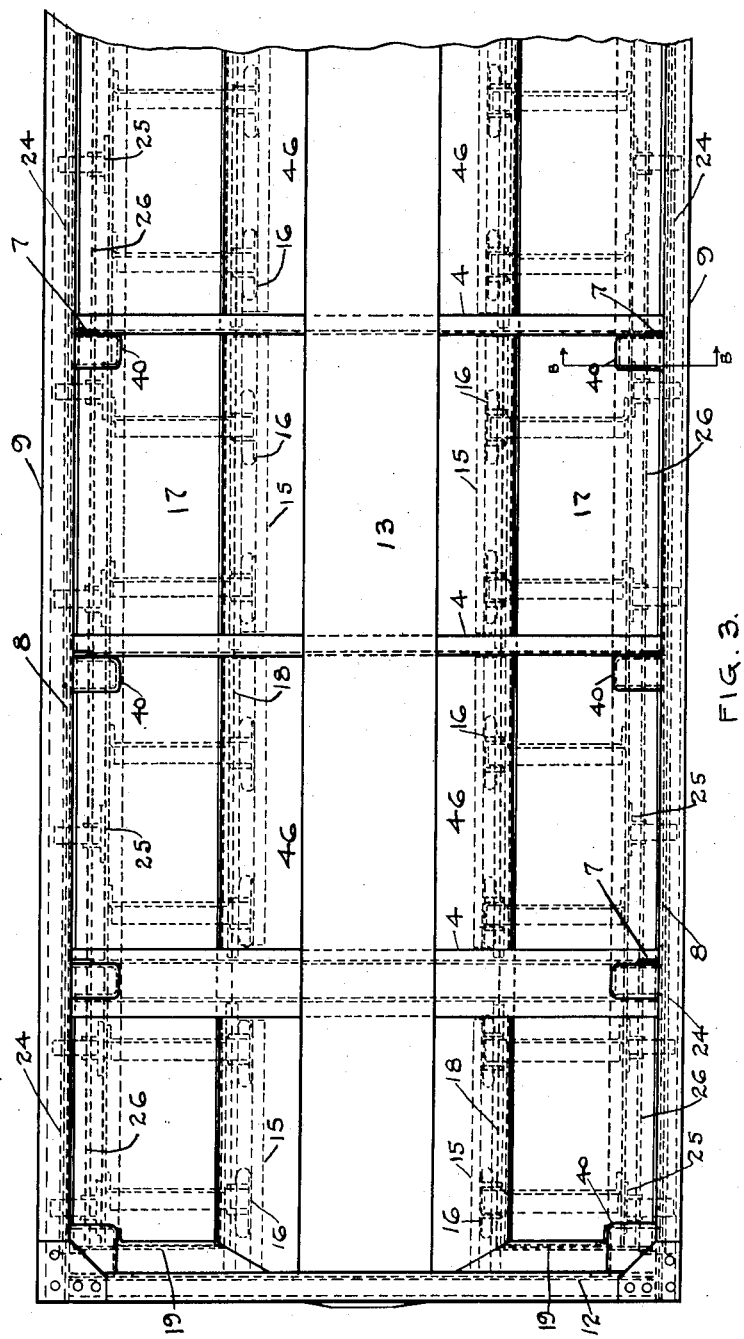
Figure 3 is a plan view of part of the car.
Figure 4:
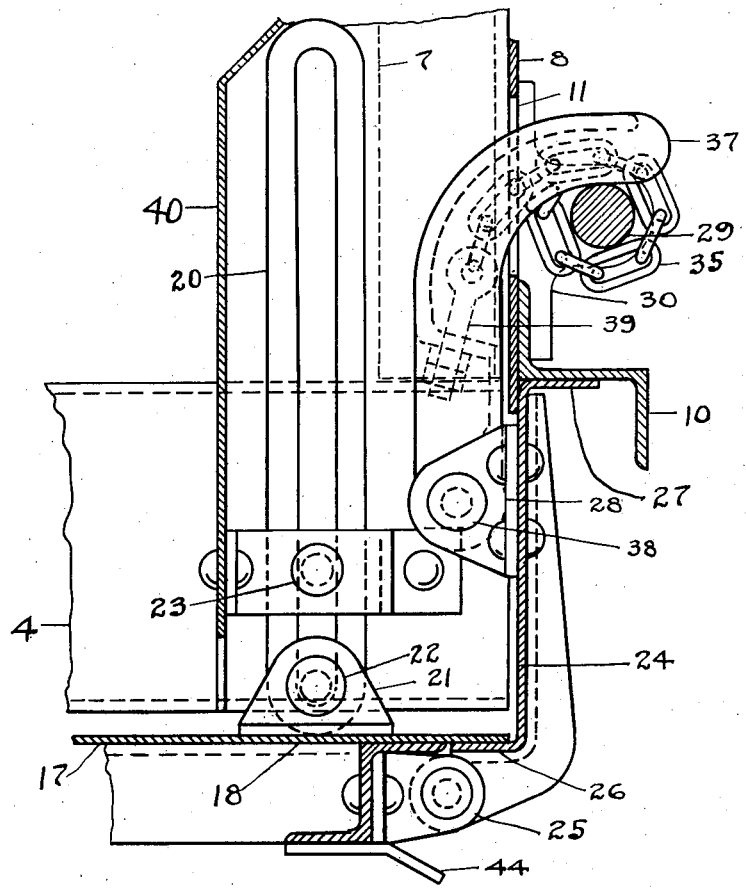
Figure 4 is a detail cross section taken on line BB Fig. 3.
Figure 5:
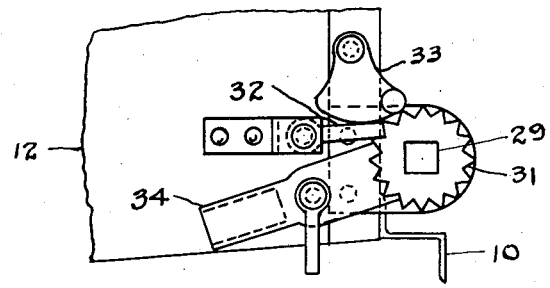
Figure 5 is a detail view of operating and locking mechanism.

In the drawings and in the following description I have shown and described that which I have considered to be new, taken in connection with so much as is old, as will properly disclose the invention to others and enable those skilled in the art to practice the same, leaving out of consideration other and well known elements, which if set forth herein would only tend to confusion, prolixity and ambiguity.

In constructing a car embodying my invention I provide center sill construction of channels 1, angles 2 and cover plate 3, all securely connected together forming a box girder, (any standard form of center sill construction may be used). Cross members 4 extend from side to side of car and rest upon and are connected to the center sill cover plate 3. Members 5 extend out from the center sill and form the body bolster of the car, and are connected to cross members 4. Plate 6 tie the bolster parts together and to the center sill, completing the bolster and carry the usual side bearings and center plate. Side stakes 7 are connected to cross members 4 and extend upwardly and are connected to side plate 8. Top side stiffener 9 is connected to side plate 8 and stakes 7. Bottom side stiffener 10 is preferably of Z shape. Side plate 8 extends a short distance below the web of stiffener 10 and has openings 11 for the operating mechanism to pass therethrough. End sheet 12 with the usual stiffeners complete the car body.

The two level floor of the car comprises central portion 13 substantially level with the top of the cross members and sloping side portions 46 which extend downwardly from the center portion to a point slightly below the bottom of cross members 4 which pass therethrough. Stiffeners 15 are located between the cross members, and between the cross members and the end of the car, and are connected thereto. These stiffeners carry the hinges 16 for the drop doors.

The drop doors 17, are on each side of the slope sheets 46, and are hinged thereto to discharge the contents of the car. I prefer to make one long door on each side of the car extending approximately from end to end continuously, for short cars and in two doors on each side for long cars. These doors dump over the trucks at each end. Door plate 18 is bent upwardly or flanged on the inside of door to make a tight joint with the slope sheet 46. At each end of door plate 18, extensions 19 are provided to prevent dumping material from going over the end of the door and onto the underframe parts or track. These extensions 19 may be connected to the door or underframe as may be required. I attach same to the door. The door plate is reinforced transversely and longitudinally in the usual manner, except the transverse reinforcement over the trucks may be on the upper face of door plate 18 to allow a greater angle to the slope of the door 17 when open.

Links 20 are pivotally connected to the door 17 by brackets 21 and pins 22 to catch and hold the door in open position. Links 20 are connected to cross members 4 by pins 23.

Door 17 being below the cross members would, if the side was brought down to the door as is the usual practice, decrease the door opening, thus retarding the flow of material therefrom. I therefore provide an auxiliary door 24, hinged to door 17 by hinges 25. This auxiliary door 24 forms a part of the side wall in the closed position, and a shedding member in the open position of the door to prevent the dumped materials from flooding the rail and falling upon the car trucks. Auxiliary door 24 also carries door 17 in the closed position, and is provided with flanged portion 26 which is under and supports door plate 18 when the door is in closed position. Flange 27 is provided to stiffen auxiliary door 24 and to form a stop for the doors when closed. Side plate 8 extends downwardly below the web of side stiffener 10 and is adapted to have the auxiliary door 24 abut there against to make a tight joint between side and door.

Operating shaft 29 is supported in bearings 30 along the side of the car and controlled by the usual ratchet 31, pawl 32, lock 33 and lever 34. Chain 35 is connected to operating shaft 29 by bolts 36 and to door operating hook 37. Hook 37 is pivoted to bracket 28 by pins 38. Chain 35 is adjustably connected to hook 37 by eye bolt 39.

Hood 40 encloses the operating mechanism to protect the same from being clogged by the material. Hood 40 is connected to side plate 8 and cross members 4 and forms a connection between the cross members and the car side.

Auxiliary door stop 44 is applied to the door stiffener in such a manner to hold the auxiliary door when open so that it will clear the journal boxes and other truck parts.

In Figure 6 I have shown an alternate construction where the fixed central portion 41 raises at an angle to the center of car and is reinforced at the apex with angle 14. The side sloping portions 46' coincide with slope sheet 46 of Fig. 1. Hook 37' is similar to hook 37, Fig. 1, except I employ pin 39 instead of an eye bolt.

To operate my dump car lock 33 is released, then pawl 32 is disengaged from ratchet 31, thus permitting shaft 29 to be rotated in the dumping direction. The rotation of said shaft will cause hook 37 to disengage from shaft 29, thus allowing the door 17 and auxiliary door 24 to fall by gravity to the position as shown in Figure 1. Links 20 will catch and hold door 17 in open position and stop 44 will hold door 24 also in open position. As soon as the car is empty the doors may be closed by placing pawl 32 into operating position and then wind shaft 29 in opposite direction to dumping. Chain 35 will wind around said shaft and first bring up auxiliary door 24 to a position at right angles to door 17, then door 17 will be raised to closed position. When the chain is wound around shaft 29 it will bring hook 37 up to and on to the shaft 29. Hook 37 is offset at 45 to form a bearing on the shaft in closed position in order to take the load off the operating chain. The connection between the operating chain and hook is adjustable in order that all hooks will bear on the shaft in closed position.

It will be noted that the operating mechanism raises and lowers auxiliary door directly and main door indirectly. By this construction it is possible to make the joint tight between the two doors thus preventing the loss of fine materials during its transportation. The weight of the load on the door 17 will be carried by the flanged portion 26 of the auxiliary door to the operating mechanism.

The operating shaft 29 is on the outside of the car, the side being open at the hood 40 to allow the operating mechanism to pass therethrough.

It will readily be seen by those skilled in the art the advantages in the two level floor construction, in which the center of gravity is lowered, the capacity of the car increased and the door opening the full length of the car is maintained the same as with the high floor general service car, making a quick dumping car with large door opening without flooding the car underframe or track.

In the drawings and this specification, I have shown and described what I consider the preferred embodiment of my invention. It will readily be seen by those skilled in the art that my invention is adapted to other cars than those shown herein. I do not wish to be confined, therefore, to the specific construction herein shown and described, but contemplate all changes and modifications that come within the scope of the claims appended hereto.

What I claim is:

1. In a dump car having an underframe, a floor and sides supported by said underframe, a portion of the floor and the car side being formed of doors below the top of said underframe and pivoted thereto, and extending continuously from end to end of the car, and means for operating said doors.

2. In a dump car, the combination of an underframe, sides, ends, permanent and movable floor and side portions, said movable floor portion extending continuously under a portion of the underframe, and said movable side portion extending continuously under the said side for substantially the length of the said movable floor portion, and both movable portions forming when in open position a discharge chute extending for substantially the length of the car and means for operating said movable parts.

3. In a dump car mounted upon a pair of trucks and having an underframe including cross members, body bolsters and end members, sides and ends supported on said underframe, a door extending below a portion of said cross members and body bolsters from the approximate center of the car to the end member thereof and forming a portion of the bottom of the car, a door substantially the length of the first mentioned door and forming a portion of the side of the car, and means for operating said doors.

4. In a dump car mounted upon a pair of trucks and having an underframe with transverse members, sides and ends, said sides being substantially above said transverse members, and having a two part door extending continuously under a plurality of transverse underframe members, one part forming a portion of the bottom of the car below said transverse members and the other part form- 5. In a dump car mounted upon a pair of trucks and having an underframe including transverse members, sides supported by said transverse members, a portion of the floor and side of the car being formed of doors extending over said trucks and inclosing said transverse members, and means for operating said doors.

6. In a dump car mounted upon a pair of trucks and having an underframe including transverse members, sides supported by said transverse members, a portion of the floor and the car side being formed of doors, one of said doors being below said transverse members and the other door being beyond said transverse members, said doors to extend over said trucks, and means for operating such doors.

7. In a dump car mounted upon a pair of trucks and having an underframe including transverse members, sides supported by said transverse members, a portion of the horizontal floor and the vertical car side being formed of doors, one of said doors being below said transverse members and the other door being beyond said transverse members, said doors to extend over said trucks, and means for operating such doors.

8. In a dump car mounted upon trucks and having an underframe comprising longitudinal and transverse members, said longitudinal members being centrally disposed, permanent sides connected to said transverse members and mounted thereabove, a bottom formed of a fixed and movable portion, said fixed portion being over said longitudinal members, said movable portion being pivoted to said fixed portion and adapted to be moved to an open position to discharge the contents of the car, said movable portion being below said transverse members and extending continuously lengthwise of the car over one of said trucks and under a plurality of transverse members, and means for operating said movable portion.

9. A dump car, the combination of a car frame and dumping doors, one of said doors forming a portion of the floor under said car frame and another of said doors forming a portion of the side of the car beyond said car frame, said doors being pivoted together, said doors extending continuously from a point near the end of the car to approximately the center of the car, and means for operating said doors.

10. A dump car, the combination of a car frame and dumping doors, one of said doors forming a portion of the floor under said car frame and another of said doors forming a portion of the side of the car beyond said car frame, said doors being pivoted together, said doors extending continuously from a point near the end of the car to approximately the center of the car, said dumping doors when open forming a chute for the discharging materials, and means for operating said doors.

11. A dump car body mounted upon a pair of trucks, and composed of an underframe, a floor and a wall; said underframe comprising longitudinal and transverse members two of which are the body bolsters; the floor comprising a fixed central section extending substantially over the longitudinal underframe members and a movable section at each side of said fixed section and below said transverse members; said wall comprising sides and ends, said sides comprising a fixed portion above said transverse members and a movable portion below the top of said transverse members and beyond the same; said movable section of said floor extending continuously below said transverse members and body bolsters from a point near each end of the car to approximately the center thereof, and said side movable portion extending substantially the length of the movable floor portion, and means for operating said movable sections for dumping the contents of said car.

12. A dump car having sides, ends and understructure, said understructure including cross members and body bolsters, of drop doors formed in two sections and extending the length of the car, below said cross members and body bolsters and adapted to form a part of the floor and sides of the car, and means for operating said doors.

13. In a dump car having an underframe composed of longitudinal and transverse members, of sides and ends supported by such underframe, a two level floor over the trucks, one level of said floor being a fixed portion and the other level a movable portion, said movable portion comprising a two part door, one part of said door being below said transverse members and the other part of said door being beyond said transverse members and forming a portion of the side of the car below the top of said transverse members, and means for operating said movable portion.

14. A car mounted upon a pair of trucks and having an underframe composed of longitudinal and transverse members, sides and ends supported by said underframe, a two level floor extending substantially constant from end to end of the car and over said trucks, the floor being composed of a central portion, side portions and intermediate portions; said central portion being horizontal and above said side portions, said side portions being below said transverse members, and the intermediate portions of said floor between said two levels being at an angle thereto.

15. In a dump car, an underframe including cross members, sides, and ends, and a floor, said floor comprising a movable member at each side and below said cross members, and a fixed central sloping section to which said movable member is pivoted, said side comprising a fixed portion above said cross members and a movable member below said fixed portion and beyond said cross members and pivoted to said movable floor member, and means for operating said movable members.

WINFIELD HANCOCK YOST.